UNITED STATES PATENT OFFICE.

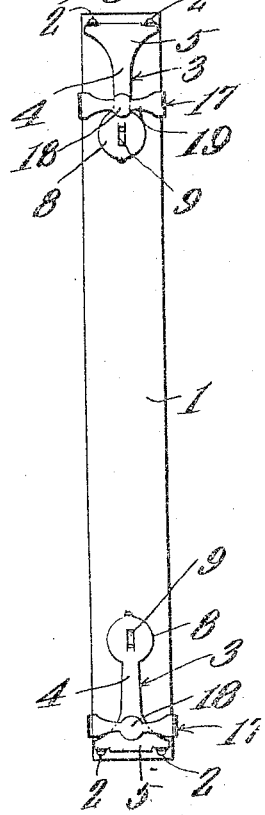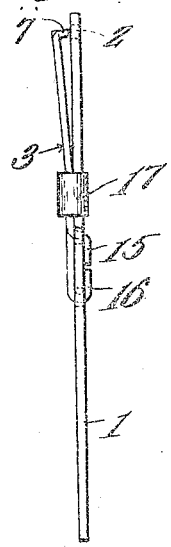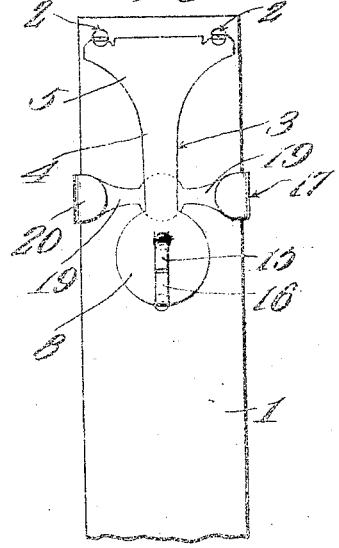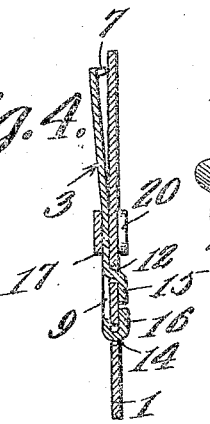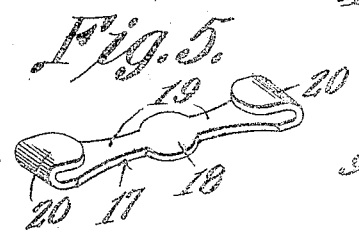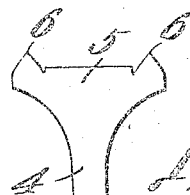

MARY B. SWEIGART, OF LEWISTOWN, PENNSYLVANIA, ASSIGNOR OF ONE-HALF TO H. W. SWEIGART, OF LEWISTOWN, PENNSYLVANIA.

COLLAR-SUPPORT.

1,062,746.  Specification of Letters Patent.  Patented May 27, 1913.

Application filed December 26, 1911. Serial No. 667,660.

*To all whom it may concern:*

Be it known that I, MARY B. SWEIGART, a citizen of the United States, residing at Lewistown, in the county of Mifflin and State of Pennsylvania, have invented a new and useful Collar-Support, of which the following is a specification.

The device forming the subject-matter of this application, is adapted to be employed for stiffening and supporting a collar transversely.

The invention aims to provide a novel form of gripping element, coöperating with the body portion of the device in engaging the collar, and to provide a slidable member of novel and improved form, controlling the action of the gripping element.

The invention aims so to construct the gripping element, that the same may be securely attached to the body; and so to construct the slidable member that the same will have the desired resiliency in its intermediate portion, and the desired stiffness at its body-engaging ends, means being provided whereby said member will afford sufficient frictional contact with the gripping element, whereby the slidable member will be held by the gripping element, at points along the gripping element.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings, Figure 1 shows the invention in front elevation; Fig. 2 is a fragmental edge elevation; Fig. 3 is a fragmental rear elevation; Fig. 4 is a fragmental longitudinal section; Fig. 5 is a perspective of the slidably mounted member which actuates the gripping element; and Fig. 6 is a plan of the blank from which the gripping element is formed.

In carrying out the invention there is provided as a primary element, a body 1, the same consisting of a flat strip of celluloid, sheet metal, or other resilient material. In the body 1, adjacent the ends thereof, there are openings 2, and gripping elements are provided, the same having parts which enter the openings, to engage the collar. Since these gripping elements are duplicates, but one of them will be described.

Each gripping element, denoted generally by the numeral 3, includes a tapered shank 4, provided at one end with a transverse head 5, from which outstand prongs 6, the same being bent rectangularly with respect to the gripping element, as shown at 7, so as to enter the openings 2 in the body 1, and to coöperate with such openings in engaging the collar, as will be understood readily. At one end, the shank 4 of the gripping element 3 is provided with a lateral enlargement 8, preferably of circular contour. In this lateral enlargement 8 a U-shaped slit 9 is formed, the same defining a tongue 10. Projecting from the periphery of the enlargement 8, in alinement with the shank 4, and oppositely disposed therefrom, is another tongue 11. In the body 1, openings 12 and 14 are fashioned. The tongue 10 which is struck from the enlargement 8, is extended through the opening 12, and clenched upon one face of the body 1, as shown at 15. The tongue 11 which projects from the periphery of the enlargement 8, is extended through the other opening 14, and is clenched upon the body 1, as shown at 16, the clenched ends 15 and 16 of the respective tongues being extended toward each other, as will be most clearly observed in Fig. 3.

The invention further includes a slidable compression member, denoted generally by the numeral 17, the compression member 17 coöperating with the gripping element 3, to cause the prongs 6 thereof to enter the openings 2, the construction of the gripping element being such, as shown in Fig. 4, that the free end of the gripping element stands away from the body 1, to withdraw the prongs 6 from the openings 2. The slidable compression member 17 includes a lateral enlargement, or body, denoted by the numeral 18, the body preferably being of circular contour. Projecting from opposite edges of the body 18 are arms 19 of tapered construction, the arms 19 terminating in hooks 20 which engage slidably with the lateral edges of the body 1.

Owing to the fact that the enlargement 18 is provided in the gripping element 3, the tongue 10 may be struck from the gripping element, without unduly weakening the gripping element. Moreover, since this gripping element terminates in the enlargement 8, the gripping element will be prevented from moving transversely, with respect to the body 1, when the tongues 10 and 11 are engaged through the body.

The laterally enlarged, body portion 18 of the slidable compression member 17, is adapted to move along the shank 4 of the gripping element 3. Owing to the relatively large area afforded by the body portion 18 of the compression member, the compression member will have sufficient frictional contact with the shank portion 4 of the gripping element, so that the compression member 17 will be held frictionally at any point along the shank, it being understood, of course, that the compression member 17 is advanced toward the prongs 6, for the purpose of causing the prongs 6 to enter the openings 2, and to coöperate with the openings 2 in engaging the collar.

The arms 19 of the compression member 17 are narrowest adjacent the body 18. Owing to this construction, the compression member will have the desired resiliency. The arms 19 are widest adjacent the hooks 20, and by reason of this fact, the compression member 17 will be strengthened and stiffened in its hooked portions 20, so that these portions may engage rigidly, and without bending, with the lateral edges of the body 1.

Having thus described the invention, what is claimed is:—

In a collar support, a body; a gripping element coöperating at one end with the body in engaging the collar, the gripping element including a shank, formed at one end with a lateral enlargement, from which enlargement a tongue is struck, the enlargement serving to reinforce the gripping element, to provide for the striking of the tongue; there being another tongue projecting from the periphery of the enlargement, both tongues being extended through, and clenched upon the body; and a member having terminal hooks slidably engaged with the edges of the body, said member including a central portion slidably engaged with the shank, the central portion being laterally enlarged, to increase the friction between said member and the shank, there being tapered arms projecting from the central portion, at the ends of which, said hooks are formed, the arms being narrowest adjacent the central portion, to afford resiliency, and being widest adjacent the hooks, to stiffen the hooks.

In testimony that I claim the foregoing as my own, I have hereto affixed my signature in the presence of two witnesses.

MARY B. SWEIGART.

Witnesses:
 EMMA STUMP,
 MAME CLARK.